United States Patent

Poulin et al.

Patent Number: 5,591,084
Date of Patent: Jan. 7, 1997

[54] TRANSMISSION JOINT BODY PORTION HAVING AN ENVELOPE WITH INTERIOR PERIPHERAL SURFACE PORTIONS EXTENDING OPPOSITE TO AND CONTOURED SUBSTANTIALLY THE SAME AS OPPOSITE REAR SURFACES OF BEARING TRACKS

[75] Inventors: Bernard Poulin, Conflans Ste Honorine; Michel Margerie, Vetheuil, both of France

[73] Assignee: GKN Glaenzer Spicer, Poissy, France

[21] Appl. No.: 124,220

[22] Filed: Sep. 21, 1993

Related U.S. Application Data

[63] Continuation-in-part of Ser. No. 778,480, Oct. 17, 1991, Pat. No. 5,279,522.

[30] Foreign Application Priority Data

Oct. 22, 1990 [FR] France ................................ 90 13038
Sep. 21, 1992 [FR] France ................................ 92 11216

[51] Int. Cl.[6] ................................................ F16C 3/00
[52] U.S. Cl. ............................................ 464/111; 464/181
[58] Field of Search ............................... 464/111, 170, 464/182, 903, 905

[56] References Cited

U.S. PATENT DOCUMENTS

| 2,194,798 | 3/1940 | Koppel . |
| 3,792,596 | 2/1974 | Orain . |
| 3,817,057 | 6/1974 | Orain . |
| 4,091,641 | 5/1978 | Welschof . |
| 4,118,952 | 10/1978 | Koyabashi . |
| 4,242,888 | 1/1981 | Komeiji et al. ......................... 464/111 |
| 4,272,971 | 6/1981 | Loyd et al. . |
| 4,360,209 | 11/1982 | Ukai et al. . |
| 4,417,880 | 11/1983 | Kumagai et al. . |
| 4,507,100 | 3/1985 | Dore et al. .............................. 464/111 |
| 4,540,385 | 9/1985 | Krude . |
| 4,747,806 | 5/1988 | Krude et al. . |
| 5,007,881 | 4/1991 | Hazebrook . |
| 5,009,628 | 4/1991 | Rouillot . |
| 5,299,981 | 4/1994 | Poulin et al. ........................... 464/111 |
| 5,320,579 | 6/1994 | Hoffmann ............................... 464/182 |

FOREIGN PATENT DOCUMENTS

| WO84/03544 | 3/1984 | European Pat. Off. . |
| 0335781A1 | 3/1989 | European Pat. Off. . |
| 489608 | 6/1992 | European Pat. Off. ................. 464/89 |
| 1268917 | 6/1961 | France . |
| 2169450 | 8/1973 | France . |
| 2508851 | 1/1983 | France . |
| 2619878 | 8/1988 | France . |

*Primary Examiner*—Daniel P. Stodola
*Assistant Examiner*—Eileen A. Dunn
*Attorney, Agent, or Firm*—Wenderoth, Lind & Ponack

[57] ABSTRACT

A transmission joint portion has an envelope with an interior peripheral surface. A plurality of bearing paths are defined by bearing tracks distributed about the axis of the envelope inside the envelope. Each bearing track has a bearing path surface on one side thereof and an opposite surface facing the interior peripheral surface of the envelope. An interior space is defined between the interior peripheral surface of the envelope and the opposite surfaces of the bearing tracks. A filler material made of one of a thermosetting and a thermoplastic matrix is filled into the interior space between the interior peripheral surface and each opposite surface. The interior peripheral surface is provided with portions extending opposite the opposite surfaces of the bearing tracks, with each portion having a contour that is substantially the same as the contour of the respective opposite surface.

7 Claims, 3 Drawing Sheets

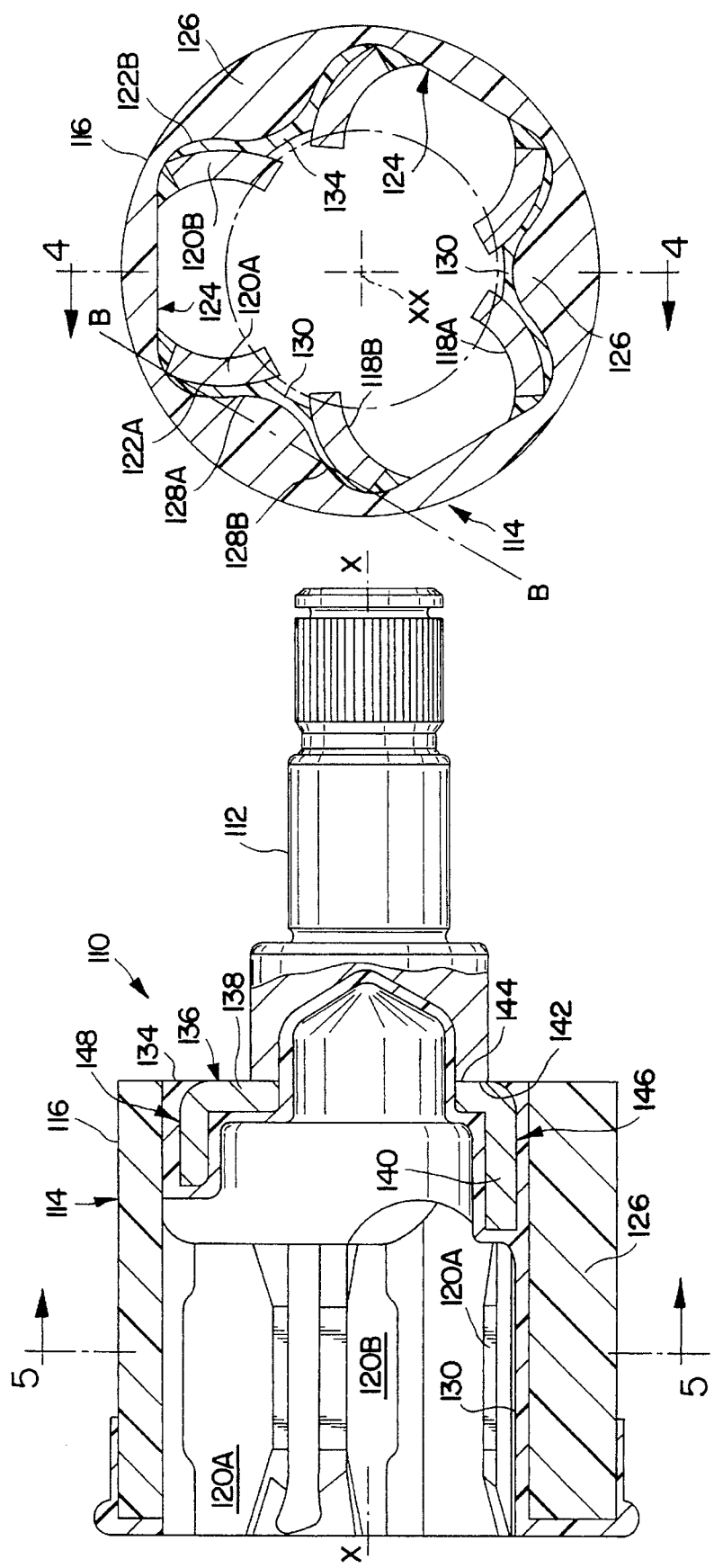

TRANSMISSION JOINT BODY PORTION HAVING AN ENVELOPE WITH INTERIOR PERIPHERAL SURFACE PORTIONS EXTENDING OPPOSITE TO AND CONTOURED SUBSTANTIALLY THE SAME AS OPPOSITE REAR SURFACES OF BEARING TRACKS

The present patent application is a continuation-in-part application of prior U.S. patent application Ser. No. 07/778,480, filed Oct. 17, 1991, now U.S. Pat. No. 5,279,522, entitled "TRANSMISSION JOINT BODY OF THE TYPE COMPRISING A CONNECTING FLANGE" by Rouillot et al.

BACKGROUND OF THE INVENTION (1) Field of the Invention

The present invention relates to a transmission joint body having a composite structure. The transmission joint is a homokinetic joint having a joint body portion that includes an envelope with bearing paths defined inside the envelope, the bearing paths receiving articulation elements of the joint.

(2) State of the Prior Art

A transmission joint body described and illustrated in U.S. patent application Ser. No. EP-A-0 335,781, corresponding to U.S. Pat. No. 5,009,628, comprises several bearing paths arranged around the axis of a joint body working in conjunction with jointing elements of the transmission joint. A connection system connects the joint body to a transmission device. The joint body further has a casing inside which the bearing paths are arranged. The bearing paths are defined by a plurality of bearing tracks disposed inside the casing. Between the peripheral surface of the casing and the rear surfaces of the bearing tracks is defined an interior space that is filled with a material made of one of a thermosetting and a thermoplastic matrix.

In the various embodiments described and illustrated in the above-referenced document, the casing exists as a cylindrical or axisymmetric part having a substantially constant thickness. Each of the bearing paths, as noted above, is defined by tracks formed by one or a plurality of inserts, whose facing surfaces operate in pairs in conjunction with the jointing elements of the transmission joint.

The design of the above-discussed transmission joint makes it possible, while preserving or increasing the torque-transmission capabilities, to substantially reduce the weight of the joint as well as to improve the vehicle comfort level, while more effectively filtering out noise and vibrations generated in the transmission joint. The joint further provides a very high corrosion resistance.

However, it can be observed that the filling material, whether or not the filling material is reinforced with short fibers or particles, and which material provides for the transmission of torque between the bearing tracks and the connection system, is present in large amounts, and thus does not function under ideal conditions, in particular given the significant specific loads that are variable in magnitude to which the joint is subjected.

SUMMARY OF THE INVENTION

To solve the problems discussed above, the present invention provides a transmission joint body of the type discussed above in which portions of the interior peripheral surface of a casing or envelope of the joint that extend opposite the rear surfaces of the bearing paths have a contour that is substantially complementary to the rear surfaces, i.e. the contours are substantially the same.

More particularly, the present invention provides a transmission joint portion that has an envelope with an axis and an interior peripheral surface. A plurality of bearing paths are defined by bearing tracks distributed about the axis of the envelope inside the envelope, with each bearing track having a bearing path surface on one side thereof and an opposite rear surface facing the interior peripheral surface of the envelope. An interior space is defined between the interior peripheral surface of the envelope and the opposite surfaces of the bearing tracks. Filler material made of one of a thermosetting and a thermoplastic matrix is filled into the interior space between the interior peripheral surface and each opposite surface. A connection system is also connected to the envelope for connecting the joint portion to other transmission elements. The interior peripheral surface of the envelope has portions thereof extending opposite the opposite surfaces of the bearing tracks, each portion having a contour substantially the same as the contour of the respective opposite surface.

Furthermore, each opposite surface is convex, and each portion of the interior peripheral surface is concave. The portions of the interior peripheral surface are divided into pairs, wherein each pair has a convex portion of the interior peripheral surface between the concave portions of the pair.

Each bearing path, further, comprises two bearing tracks. Each bearing track has the bearing path surface thereof facing the bearing path surface of the other bearing track. The interior peripheral surface of the envelope has a series of axial bosses, with each boss projecting radially inwardly and defining two of the portions of the interior peripheral surface that extend opposite to opposite surfaces of two adjacent bearing tracks of two different bearing paths.

The connection system comprises an anchoring member that has an axially extending lateral wall that extends into the filler material. The lateral wall has an outer face with alternating convex and concave portions. The axial bosses of the envelope extend into and have substantially the same contour as the concave portions of the lateral wall of the anchoring member.

The envelope preferably has a cylindrical outer surface. Further, the envelope is preferably made of a composite material reinforced with the continuous fibers. The filler material, further, is preferably reinforced with the short fibers or particles.

BRIEF DESCRIPTION OF THE DRAWINGS

Further features and advantages of the present invention will become apparent from the following detailed description of preferred embodiments thereof, with reference to the accompanying drawing figures, in which:

FIG. 4 is a side view of a second embodiment of the transmission joint portion according to the present invention in partial cross-section and taken along line 4—4 of FIG. 5;

FIG. 5 is an axial cross-sectional view taken along 5—5 of FIG. 4;

DETAILED DESCRIPTION OF THE PREFERRED EMBODIMENTS

Figure 3:
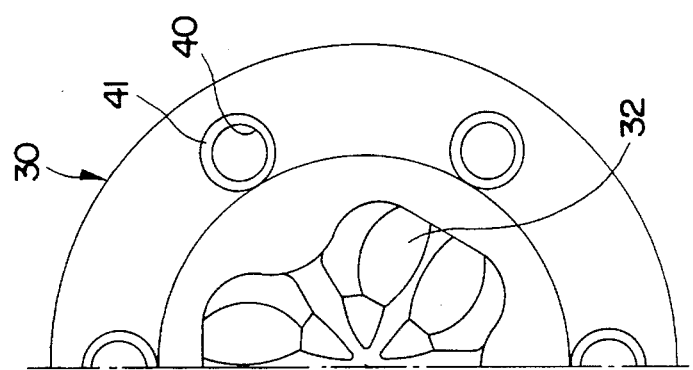
FIG. 3 is an axial half-view in the direction of arrow F of FIG. 1.
Figure 2:
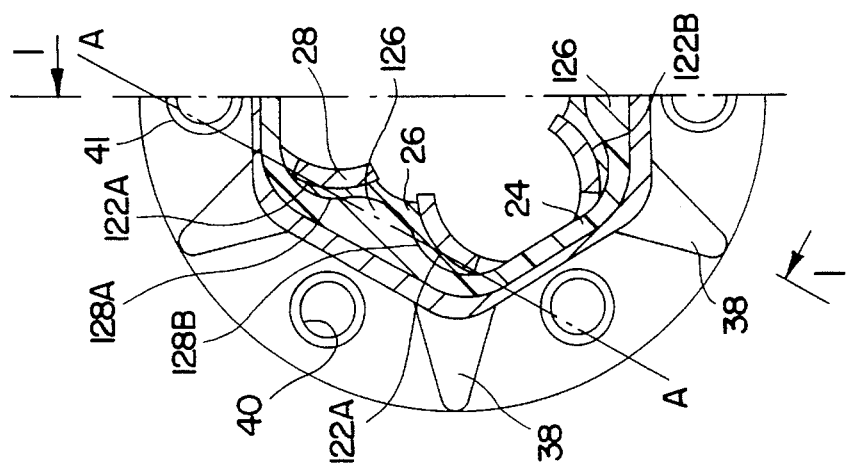
FIG. 2 is an axial half-view taken in section along line 2—2 of FIG. 1.
Figure 1:
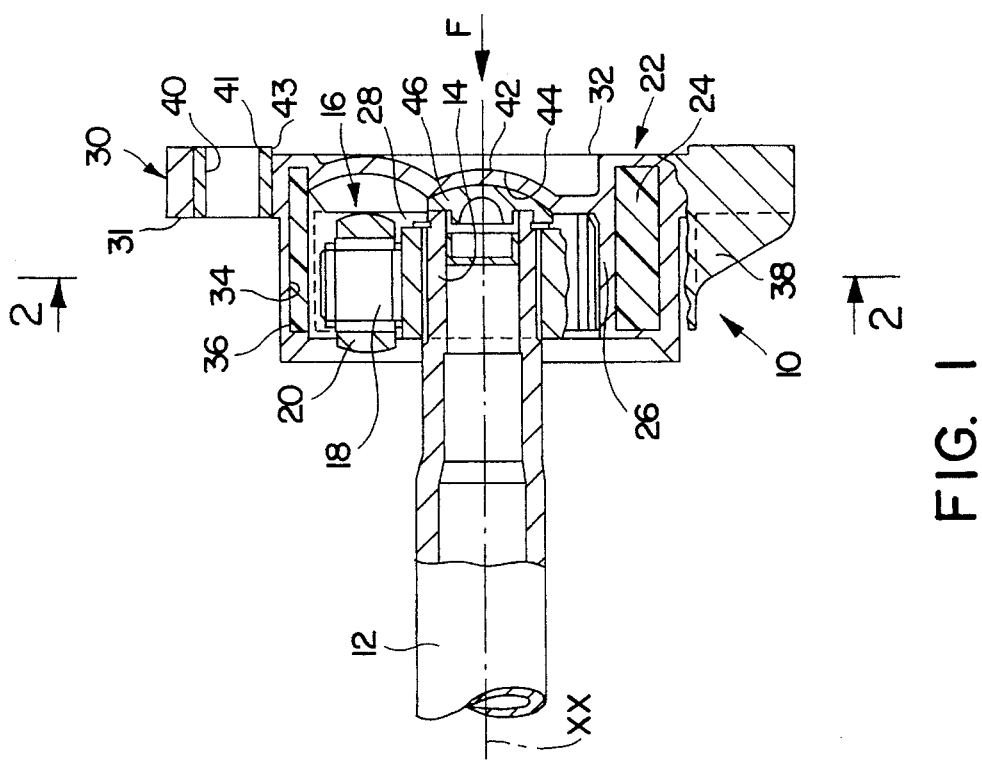
FIG. 1 is a sectional side view taken along line 1—1 of FIG. 2 of a transmission joint having a transmission joint portion according to the present invention.
Figure 7:
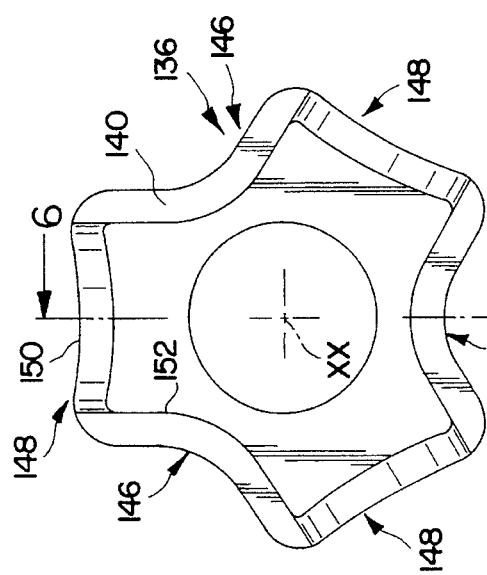
FIG. 7 is an axial view of the anchoring member of FIG. 6.
Figure 9:
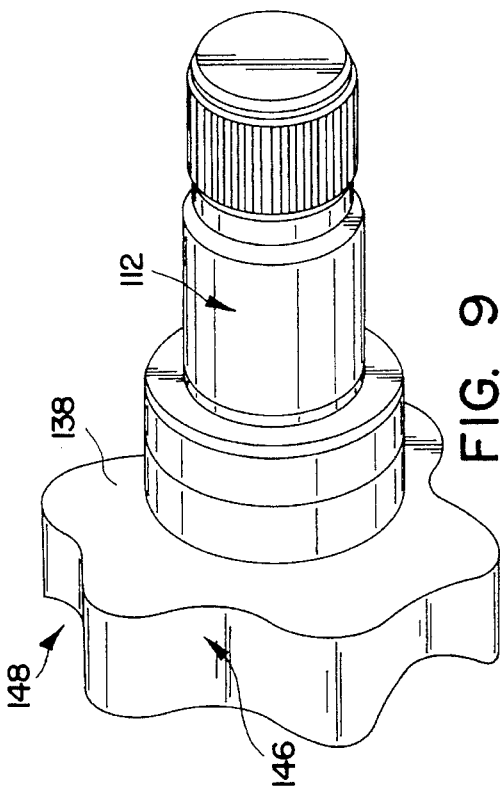
FIG. 9 is a perspective view of the connection system of the second embodiment employing the anchoring member of FIGS. 6–8.
Figure 6:
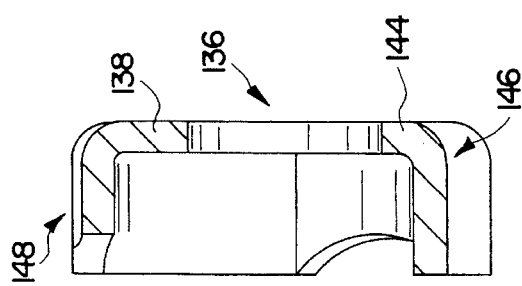
FIG. 6 is a cross-sectional view taken along line 6—6 of FIG. 7 of an anchoring member of a connection system according to the second embodiment.
Figure 8:
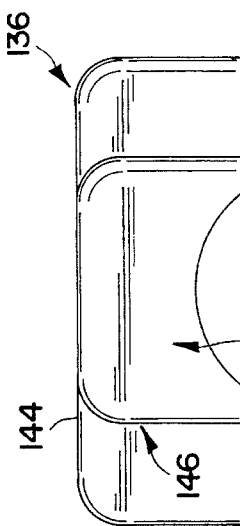
FIG. 8 is a side view of the anchoring member of FIGS. 6 and 7.

Referring to FIGS. 1–3, a first embodiment according to the present invention will be described.

In FIGS. 1–3, a transmission joint 10 is provided for connecting a shaft 12 to another shaft or to a transmission member (not illustrated). Shaft 12 has a free end 14 which comprises a tripod 16. The tripod 16 has arms 18 with rollers 20, which arrangement is generally known. The tripod 16 interacts with a transmission joint body 22.

The transmission joint body 22, also referred to as a tulip or barrel, is of the type having a composite structure, and includes an envelope or casing 24 that defines an interior space that is partially filled with a filler material 26. The joint body 22 also includes bearing paths for the rollers 20 of the tripod 16. Each bearing path comprises two bearing tracks 28 that are combined with the envelope or casing 24 by the filler material 26. The bearing tracks 28 are embedded in the filler material 26 in a similar manner to that described and illustrated in patent application EP-A-0 335,781, corresponding to U.S. Pat. No. 5,009,628, the contents of which reference should be made in order to ascertain the various structural and embodiment features, and which U.S. Patent is hereby incorporated by reference.

As can be particularly seen in FIG. 2, the bearing tracks 28 of each bearing path have convex cylindrical rear surface portions 122A and 122B. The envelope or casing 24 has lobes 126 spaced angularly at 120°. The lobes extend between two adjacent bearing tracks 28 of two different bearing paths. The lobes further define concave surfaces 128A and 128B formed on either side of each convex portion of the lobes 126, providing surfaces opposite to the rear surfaces of the bearing tracks 28. Portions of the surfaces 128A and 128B extend complementary to the rear surfaces of the bearing tracks, thus having substantially the same contour as the bearing tracks. As noted above, the filler material 26 fills in the space defined between the surfaces 122A and 122B on the rear of the bearing tracks 28 and the concave surfaces 128A and 128B of the envelope or casing 26.

Similar to the envelope or casing 24, the filler material 26 preferably comprises a thermosetting or thermoplastic matrix reinforced with short fibers or particles.

In FIGS. 1–3, the first embodiment according to the present invention, the joint body 22 is provided with a radial connecting flange 30 for connecting the joint body 22 to a transmission member. The flange 30 extends in a radial plane situated substantially in the vicinity of an axial end face 32 of the joint body 22 situated opposite the shaft 12. The radial flange 30 is made from a composite material of the type comprising a thermosetting or thermoplastic matrix reinforced with short fibers or particles. Preferably the filling material 26 and the flange 30 are made from the same material.

Further, the material 26 is preferably extended axially outside the radial inner space defined by the peripheral envelope 24 through the axial end of the joint body 22 on the right-hand side thereof as viewed in FIG. 1. The material is then extended radially to form the flange 30, the flange being produced in a single operation during injection molding of the material 26 into and around the envelope 24.

The material 26 also extends substantially over the entire outer peripheral surface 34 of the envelope 24 in order to form a peripheral layer 36. The flange further comprises a plurality of webs 38 produced during molding which extend in axial planes in order to connect the radial face 39 of the flange to the outer peripheral surface of the envelope 24. In the illustrated embodiment, the radial flange 30 comprises six axial connecting holes 40. Each hole 40 is produced in the form of a hollow tubular metal insert 41 embedded in the composite material during molding of the transmission joint body.

The inserts are smooth-bore tube sections 40, but could also be replaced by internally threaded tubes or bolts or any other type of connecting means enabling the flange 30 to be fixed to a transmission member, depending on the type of application of the joint.

Preferably, a wall 42 closes the open axial end of the joint body 22, also produced directly during molding of the filling material 26. The wall 42, in addition to providing a closing function, can be provided with an inner profile 44, for example in the form of a spherical dome, complementing the outer profile of an end cap 46 of the shaft 12. These two surfaces thus interact as a function of the break angle of the joint.

According to another feature of the connecting system of the first embodiment, the outer cylindrical wall of the inserts at portions 43 are not surrounded by composite material, and thus constitute a precise geometrical reference for the centering of the joint body during assembly by means of a flange.

The closing wall 42 also provides an axial abutment surface for the displacement of a shaft 12 when the transmission joint is a joint of the sliding type.

A second embodiment of the present invention will now be described with reference to FIGS. 4–9.

FIGS. 4 and 5 illustrate a tulip-shaped transmission joint portion 110 for use with a tripod-equipped homokinetic joint. The joint portion 110 includes a metal connection shank 112 and a casing 114 with a cylindrical peripheral outer surface 116 coaxial with an axis X—X of the linking shaft 112. Three bearing paths are defined inside the casing or envelope 114 and are angularly arranged at 120°. Each bearing path is made up of two bearing tracks 120A and 120B.

Each bearing track 120A and 120B is an independent metal insert which has a concave travelling surface 118. Each bearing path thus has two opposite travelling surfaces 118A and 118B as illustrated. Each independent metal insert is an inwardly-curved metal segment with a substantially constant thickness. Further, each independent metal insert also has a rear convex cylindrical surface opposite to the travelling or bearing path surface, these opposite surfaces being designated 122A and 122B for each bearing path.

In accordance with the present invention, portions of an interior peripheral surface of the envelope 114 have a contour in transverse cross-section, as seen in FIG. 5, designed so as to be substantially the same as the contour of the opposite rear surfaces 122A and 122B of the bearing tracks 120A and 120B.

The envelope 114 further has three bosses 126 arranged at 120° about the axis X—X. Each boss 126 projects radially inward in the direction of the axis X—X, and extends axially and substantially parallel to this axis between the portions of the outer cylindrical convex surfaces 122A and 122B of two adjacent tracks 120A and 120B belonging to two adjoining bearing paths over the entire axial length of the casing.

As can be seen from FIG. 5, the interior peripheral surface of the envelope 114 has portions forming concave surfaces 128A and 128B. Each boss 126 thus defines a central convex surface 130 and the concave surfaces 128A and 128B.

Each concave surface 128A and 128B of the surface of a boss portion 126 extends opposite to, and is substantially parallel with, a portion of the outer convex cylindrical surfaces 122A and 122B of the bearing tracks 120A and 120B. An interior space is defined radially by the inner peripheral surface of the bosses 126 and the convex surfaces 122A and 122B. This interior space is filled with a filling material 134. The filling material 134 may be a thermosetting or thermoplastic matrix or resin, reinforced with short fibers or particles.

Furthermore, in accordance with the methods described and illustrated in EP-A-0 335,781 discussed above, the filling material may be a molding material that is injected into the tulip-shaped receptacle and fills the interior space so as to position and attach the bearing tracks in the outer casing 114.

The connection system according to the second embodiment of the present invention employs an anchoring member 136 connecting to the metal connection shank 112 so connect the joint portion 110 to a torque transmission device. The anchoring member 136 is a hollow metal part whose thickness is substantially constant, and which comprises a transverse bottom 138 and a lateral wall 140 extending axially from the transverse bottom 138. An axial annular end face 142 of the connecting shank 112 is welded to an outer and opposite face 144 of the transverse bottom 138.

The lateral wall 140 extends axially inside the envelope or casing 114. It is connected to the envelope or casing 114 by the filling material 134, as can be seen from FIG. 4.

As can be further seen from FIGS. 6–9, the outer face of the lateral wall 140 has substantially convex and concave portions 146 and 148 alternatingly and evenly distributed around the axis X—X. As can be seen from FIG. 7, the contour of each convex part 146 is substantially complementary to that of an inner boss 126 of the casing 114. That is, each convex part 146 has substantially the same contour as that of its inner boss 126. This ensures that the filling material 134 that is contained between these two complementary and facing surfaces will work under optimal conditions. The filling material 134 thus extends over the outer and inner faces 150 and 152 of the lateral wall 140 in a layer of substantially constant and reduced thickness.

Thus, in the present invention, by the provision of the lobes 126 and the defining of the concave surfaces complementary to the convex surfaces of the bearing tracks, there are provided coextensive complementary surface areas defining a space between the bearing tracks and the envelope or casing. The filling material 134 that is then provided in the space between the bearing tracks and the envelope or casing is thus substantially reduced as compared with the European patent application discussed above. As a result, the filling material 134 in the areas opposite to the bearing tracks 120A and 120B will work under hydrostatic pressure conditions. Such hydrostatic pressure conditions are ideal for torque transmission.

Thus, as a result of the present invention as discussed above and described in the accompanying drawings, the overall quantity of filling material 134 is particularly reduced, and the portions of this material that transmits torque under compression works under ideal hydrostatic pressure conditions.

Attention is again directed to FIGS. 2 and 5 of the present application. Lines A—A and B—B in these figures, respectively, indicate the planes that extend between the radially outermost axial edges of the bearing tracks. From this, it can be seen that the lobe or boss 126 extends radially inwardly beyond this plane.

It is noted that the present invention is not limited to the embodiments described above. In particular, the bearing tracks could be produced in accordance with any suitable method, such as one of the methods described and illustrated in the European patent application 335,781 discussed above. The bearing tracks could also be replaced by linings made of a hard material placed on the filler material upon completion of the molding operation. Further, the envelope or casing 114 could be made of a composite material incorporating an organic matrix reinforced with continuous fibers.

We claim:

1. A transmission joint portion, comprising:

an envelope having an axis and an interior peripheral surface;

a plurality of bearing paths inside said envelope, wherein each of said bearing paths is defined by and comprises bearing tracks inside said envelope, and wherein each one of said bearing tracks has a bearing path surface on one side thereof and an opposite surface facing said interior peripheral surface of said envelope;

an interior space defined between said interior peripheral surface of said envelope and each said opposite surface of said bearing tracks;

a filler material comprising a material selected from the group consisting of a thermosetting matrix and a thermoplastic matrix, said filler material being filled into said interior space between said interior peripheral surface and each said opposite surface;

wherein said interior peripheral surface of said envelope has contoured portions thereof extending opposite said opposite surfaces of said bearing tracks, each of said contoured portions having a contour substantially the same as the contour of the respective said opposite surface of one of said bearing tracks;

wherein each said bearing path comprises two said bearing tracks, each said bearing track having said bearing path surface thereof facing said bearing path surface of the other said bearing track;

wherein said interior peripheral surface of said envelope comprises a series of axial bosses, each of said bosses projecting inwardly toward said axis of said envelope and defining two of said contoured portions of said interior peripheral surface that extend opposite two of said opposite surfaces of two adjacent said bearing tracks of two different said bearing paths; and an anchoring member connected to said envelope, said anchoring member having an axially extending lateral wall extending into said filler material, said lateral wall having an outer face with alternating convex and concave portions, and said axial bosses of said envelope extending into and having substantially the same contour as said concave portions of said lateral wall of said anchoring member.

2. The transmission joint portion of claim 1, wherein each said opposite surface is convex, and each said contoured portion of said interior peripheral surface is concave.

3. The transmission joint portion of claim 2, wherein said contoured portions of said interior peripheral surface of said envelope are divided into pairs, and wherein each of said pairs has a convex portion of said interior peripheral surface located between said concave contoured portions thereof.

4. The transmission joint portion of claim 1, wherein said envelope has a cylindrical outer surface.

5. The transmission joint portion of claim 1, wherein said envelope is annular and made of a composite material reinforced with continuous fibers.

6. The transmission joint portion of claim 1, wherein said filler material further comprises short fibers or particles.

7. The transmission joint portion of claim 1, wherein said contoured portions are substantially parallel to said opposite surfaces.

* * * * *